United States Patent [19]

Oni et al.

[11] 3,908,345
[45] Sept. 30, 1975

[54] HEIGHT CONTROL FOR IMPLEMENT SUPPORT ON AN AGRICULTURAL MACHINE

[75] Inventors: Helmut Oni, Gottmadingen; Dieter Grabenhorst, Dulmen, both of Germany

[73] Assignee: Maschinenfabrik Fahr Aktiengesellschaft, Gottmadingen, Germany

[22] Filed: Dec. 3, 1973

[21] Appl. No.: 421,494

[30] Foreign Application Priority Data
Dec. 15, 1972 Germany.............................. 2261558

[52] U.S. Cl.................................... 56/208; 56/10.9
[51] Int. Cl.² ......................................... A01D 67/00
[58] Field of Search ............. 56/208, 10.9; 172/663, 172/667; 280/6.1, 47

[56] References Cited
UNITED STATES PATENTS

| | | | |
|---|---|---|---|
| 3,509,701 | 5/1970 | Clarke ................................. | 56/208 |
| 3,698,164 | 10/1972 | Boone et al........................... | 56/208 |
| 3,707,834 | 1/1973 | Schumaker et al................... | 56/208 |
| 3,728,851 | 4/1973 | Van Antwerp ....................... | 56/208 |

FOREIGN PATENTS OR APPLICATIONS 1,263,409  2/1972  United Kingdom 1,937,346  4/1971  Germany .............................. 56/208

*Primary Examiner*—Louis G. Mancene
*Assistant Examiner*—James D. Hamilton
*Attorney, Agent, or Firm*—Karl F. Ross; Herbert Dubno

[57] ABSTRACT

An agricultural machine has a pivotally mounted implement support which is vertically positioned by a valve-operated hydraulic piston-and-cylinder arrangement. A single control lever is operable from a central HOLD position between two nonlocking (nonindexed) RAISE and LOWER positions to operate this piston-and-cylinder arrangement as well as to two locking (indexed) FOLLOW and SET positions. In the SET position switches carried by a set-point indicator are connected to the hydraulic-cylinder valve, and an actual-value indicator pivoted next to the set-point indicator on the frame of the machine and linked to the support serves to operate these switches to maintain the support in a predetermined position relative to the machine frame. In the FOLLOW position the support can be positioned in a balance mode wherein the pressure in its ram is kept within a certain range so that this support rides lightly on the ground, or limit switches operated by a ground feeler can be connected through the control to the hydraulic-cylinder valve to maintain the support at a predetermined spacing above the ground.

9 Claims, 11 Drawing Figures

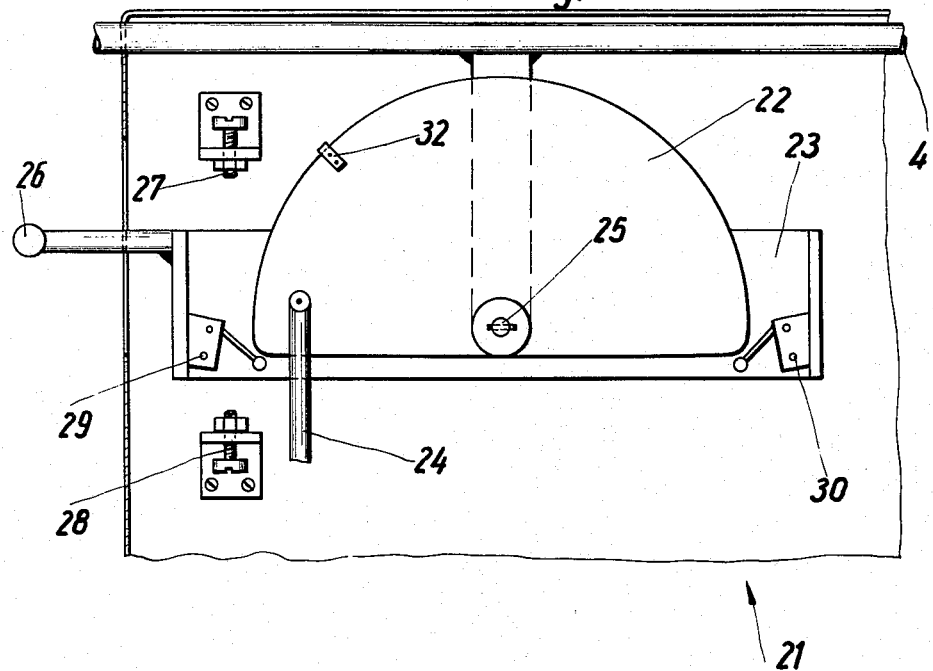
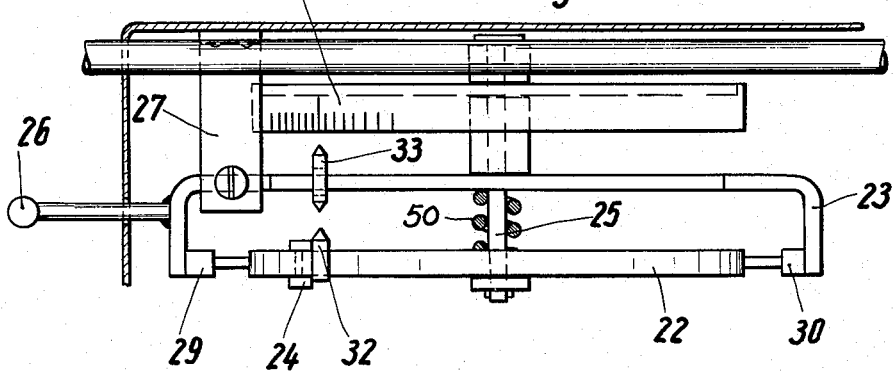

Raise

Set

Hold

Follow

Lower

HEIGHT CONTROL FOR IMPLEMENT SUPPORT ON AN AGRICULTURAL MACHINE

FIELD OF THE INVENTION

The present invention relates to an agricultural machine. More particularly this invention concerns a control system for positioning the implement support on an agricultural machine which is adapted to move along the ground.

BACKGROUND OF THE INVENTION

Mowers or row-crop harvesters on agricultural machines are customarily mounted on an implement support which is pivotal on the frame of the vehicle. This support extends in front of the vehicle and must be held at a carefully controlled level relative to the ground.

Two principal methods exist for setting the height of the implement support. The simplest method is to hold the support in a predetermined position relative to the frame of the vehicle. In this manner a level field can easily be harvested with little difficulty.

Another method which is particularly useful for fields of irregular terrain is to provide a sensing arrangement which established a particular support position relative to the ground under the support. Thus the implement will follow the ground contours.

Both systems usually employ one or two heavy-duty hydraulic rams (pistons) to raise and lower the implement support. A hydraulic pump and reservoir on the machine constitute sources of relatively high and relatively low pressure, respectively, to pressurize and depressurize the ram, thereby extending and contracting it, respectively. A three-position valve is operated to effect these two functions as well as to hold the pressure in the rams to stabilize the support relative to the machine frame.

The operator of the machine conventionally is provided with a spring-loaded lever having a RAISE position at the top of its arc of displacement and a LOWER position at the bottom of this arc. The spring urges the lever down and detents are provided to restrict return of the lever at any one of a plurality of intermediate positions. Mechanism connected to the support establishes predetermined height positions relative to the ground for each of these intermediate positions of the levers. When the end of a row is reached and the agricultural machine must be turned around, or when an obstacle in the field being harvested must be avoided, the operator lifts the lever from whichever intermediate position it is in, thereby raising the implement support. The lever is released and returns to its preset intermediate position when the turn is completed or the obstacle is passed.

As discussed above such machines are frequently provided with feelers on the implement support which allow this support to follow the ground contours. It is known to have such a FOLLOW control for the operator which he may actuate to cancel out the SET function of his adjustment lever, should he desire to have the implement follow the contours of the field. Adjustment of this follow control is conventionally carried out by displacement of the feeler on the support.

Should the operator wish to switch from one function to another, he must frequently operate a secondary control before this is possible. For instance if he is riding over a hollow in the field he must withdraw the detent locking his control lever in an intermediate position in order to lower the implement support sufficiently, and thereafter the detent must be repositioned in order to ride along level ground. Also it is not simple for him to switch over from operation with the support following the ground contours to operation with the support set at a predetermined position relative to the frame.

OBJECTS OF THE INVENTION

It is therefore an object of the present invention to provide an improved agricultural machine of the above-described general type.

Another object is an improved control system for the FOLLOW, SET, RAISE, and LOWER functions of the implement support on an agricultural machine such as a harvester thresher.

SUMMARY OF THE INVENTION

These objects are attained according to the present invention in a control system wherein the control valve which operates the hydraulic ram (piston) of the implement support is connectable through a single control to the relatively high- and low-pressure sources of hydraulic pressure. This control has a single control element displaceable between four positions: a RAISE position in which it operates the valve to pressurize the ram, a LOWER position in which it operates the valve to depressurize the ram, a SET position in which it connects the valve to first sensor means which operates the valve to maintain the implement support in a predetermined position relative to the frame of the machine, and a FOLLOW position in which it connects the valve to second sensor means which operates the valve to maintain the implement support in a predetermined position relative to the ground. According to this invention means is provided for locking the control element when it is in either of at least two of these positions, preferably the FOLLOW and SET positions, and for resisting retention of the element in the other two positions. Thus the operator need merely push the lever into the RAISE or LOWER position from the FOLLOW or SET positions in order to compensate manually for an irregularity in the terrain. Similarly if a single swath or row is best harvested with the support following the ground rather than set relative to the frame, it is a simple operation for this operator to push the same lever from the SET to the FOLLOW position, or vice versa.

In accordance with the invention the control element has a fifth position corresponding to a HOLD function of the implement support. This fifth position lies in the middle of an array of the other positions. Thus if, for instance, the machine is being returned to the barn, the operator need merely push the lever into the RAISE position until the support is lifted all the way up, and then let it return by spring power to the central HOLD position. The support will remain in the position it was last in.

According to another feature of this invention the first sensor means includes a pair of commonly pivoted elements, one of which is linked to the support and thereby comprises an actual-value indicator, and another which can be set manually and which thereby comprises a set-value indicator. This latter indicator carries a pair of limit switches which are connectable through the control circuit to solenoids which operate the valve. Thus when the actual-value indicator is rotated into a position relative to the set-value indicator to show that the implement support is higher than the set value, one of the switches will be actuated to operate the valve and lower the support. Similarly if the support is too low the other switch will cause the support to be lifted.

According to yet another feature of our present invention the second sensor comprises a feeler arrangement which engages the ground below or in front of the implement support and which has a pair of vertically spaced limit switches which can be connected through the control to the solenoid-operated valve to raise or lower the support when the feeler detects that the space between the support and the ground is less or more, respectively, than the desired specing. The feeler may be mounted on the stalk deflector or grain lifter of the machine. This second sensor means can also comprise a balancing device which detects the force exerted on the support by the ram and which raises the support when it detects that less force is needed and lowers it when more is needed.

This latter arrangement comprises, according to the present invention, a pressure-operated switch connectable through the control circuit to the solenoid-operated valve. The switch has one side which closes if the pressure in the ram exceeds a predetermined pressure, and another side which closes if the pressure drops below a second predetermined pressure. Thus a pressure within a certain range is maintained in the ram at all times so that the support floats or rides lightly on the ground.

The arrangement according to the present invention is simple to operate. With only a little practice the operator of the machine can manipulate the single lever to control the height of the implement support with no difficulty, indeed without even looking at what he is doing. The set point for the SET function of the system is established according to the crop and need not be altered no matter what other functions are required during that particular harvest. Similarly the pressure switchover adjustments for the balancing mode of the FOLLOW function or the height adjustment for the level mode of the FOLLOW function can be set rapidly with the settings being undisturbed by other use of the apparatus.

DESCRIPTION OF THE DRAWING

The above and other objects, features, and advantages of the present invention will become more readily apparent from the following description reference being made to the accompanying drawing in which:

FIG. 2 is a side-elevational view of an element of the system of FIG. 1;

FIG. 3 is a top sectional view of the element of FIG. 2;

SPECIFIC DESCRIPTION

Figure 1:
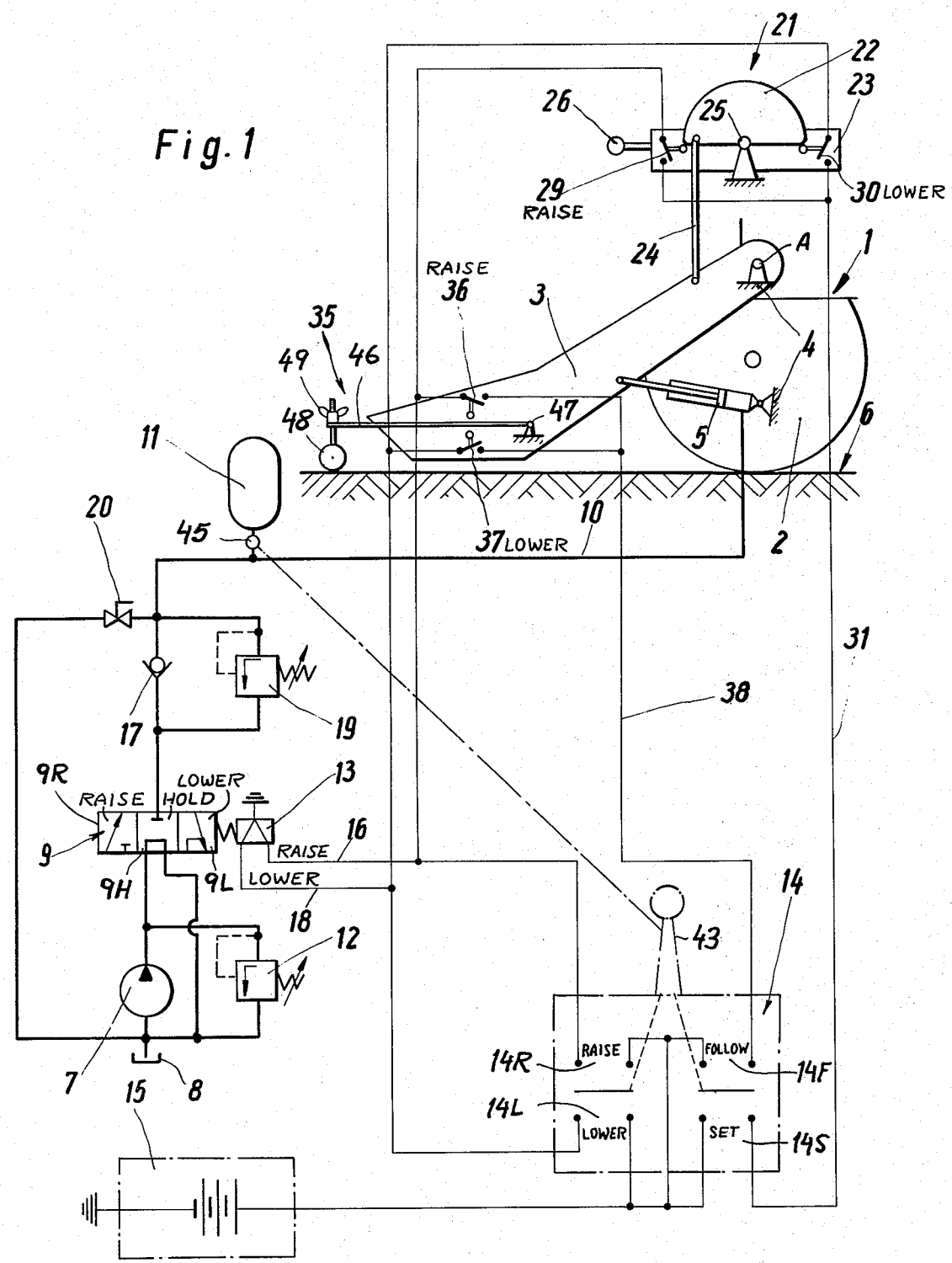
FIG. 1 is a schematic side view of the system according to the present invention.

As shown in FIG. 1 a mower 1 has a frame shown schematically at 4 and front wheels 2 which ride along the ground surface 6. An implement support 3 is pivoted on the frame 4 about an axis A and extends in front of the wheels 2. The support 3 carries a field harvester or the like as described in the commonly assigned U.S. Pat. No. 3,705,482 issued on Dec. 12, 1972 to Josef Pürrer, and other patents to the same inventor. At least one heavy-duty hydraulic ram 5 is braced between this pivotal support 3 and the frame 4 of the apparatus 1, so that the position of the mower support 3 relative to this frame 4 and relative to the ground 6 is established by the cylinder 5.

A continuously operating hydraulic pump 7 is connectable through a three-position valve 9 and a one-way valve 17 to the cylinder 5 to pressurize its working chamber. A diaphragm accumulator 11 is connected through a valve 45 to the hydraulic line 10 feeding the cylinder 5. Such an accumulator is described at pages 85–89 of *Fluid Power* (Government Printing Office, 1966) and serves to protect the valve 9 and other components from pressure surges. A reservoir 8 of hydraulic fluid is connected to the input of the pump 7 and can be connected to the cylinder 5 by the valve 9.

This valve 9 has three sections 9R, 9H, and 9L which are connectable between the pump 7, cylinder 5, and reservoir 8 to effect the operations of raising, holding, and lowering the support 3, respectively. A two-coil solenoid 13 has one grounded output and an input 16 which, when energized, pulls the section 9R between the pump 7 and cylinder 5, and an input 18 which, when energized, pushes the section 9L between the pump 7 and cylinder 5. When neither coil is energized the valve 9 resumes its middle position with the section 9H between the pump 7 and cylinder 5.

When the section 9H is connected between the pump and the cylinder the output of the pump is fed directly back into the reservoir 8. With the section 9R in position the pump output is fed through the valve 17 and line 10 to the cylinder 5 to expand it. The section 9L connects the output of the pump as well as the cylinder 5 to the reservoir, with a pressure relief valve 19 as described on pages 157–159 of *Fluid Power* (op.cit.) by passing the valve 17 and keeping a predetermined pressure in line 10 which can only be relieved by opening a valve 20 connected between the line 10 and the reservoir 8. The pump 7 is protected during the switching by another such pressure-relief valve 12 which is connected across it and prevents excessive pressure from building up at the pump output.

The solenoid 13 is actuated electrically from a power supply 15 whose one side is grounded and whose other side may be connected through a four-position switch 14 to either of its inputs 16 or 18. An operating element 43 resembling a gearshift lever serves to close at any one time any one of four sets of contacts 14R, 14L, 14F, and 14S of this switch 14 and also serves to operate the valve 45. As will be described more fully below the switch 14 is of the momentary-contact type, which must be held closed, for the contacts 14R and 14L, but will hold in position and remain closed for the contacts 14F and 14S.

This switch 14 is provided closely adjacent the steering wheel of the vehicle 1 so that the driver can at any instant quickly grasp the element 43 and operate it. As should be clear from the schematic of FIG. 1, when the contacts 14R are closed the input 16 of the solenoid 13 is energized and the arm 3 will be lifted, and when the contacts 14L are closed the support 3 will be lowered.

When element 43 is moved to close contacts 14R the valve 45 is closed.

The support 3 for the mower is provided with a feeler arrangement 35 which has a lever 46 pivoted at 47 on the support 3 about a horizontal axis. A wheel 48 at the leading end of the arm 46 rides on the ground 6 and the spacing between this leading end and the ground is determined by an adjustment arrangement 49 that allows the rod carrying the wheel 48 to be screwed up and down in the arm 46. A switch 36 above the arm 46 is closed when this arm moves up from the illustrated horizontal position, and a switch 37 below the arm 46 closes when the arm drops from this position.

Actuation of the arm 43 to close the contacts 14F will cause the support 3 to follow the contours of the ground ahead of the vehicle 1. These contacts 14F connect one side of each of the switches 36 and 37 to the battery 15. The other side of the switch 36 is connected to input wire 16 and the other side of switch 37 to wire 18. In this manner when the wheel 48 and arm 46 drop to close switch 37, indicating that the support 3 for some reason is moving up away from the ground 6, the line 18 is energized to pull section 9L of the valve 9 into the center and lower the support 3 by depressurizing cylinder 5. When the support 3 drops enough so that the wheel 48 again engages the ground and the arm 46 is lifted from the switch 37, this switch 37 will open and the section 9H of valve 9 will move to the middle to hold the support 3 in place. Similarly a rise in the ground 6 relative to the support 3 will lift the arm 46 and close the switch 36, thereby energizing line 16 to raise the support 3 until the switch 36 opens again. At any time when the element 43 is set so that the mower follows the contours of the ground it is possible for the operator, in order to turn the mower or avoid an obstacle, to push the lever 43 to close contacts 14R or 14L and thereby raise or lower the support 3. After override, he need merely return the lever to position 14F and the mower will automatically again seek the proper position relative to the ground surface 6.

The position of element 43 in which contacts 14S are closed sets the support 3 at a particular height relative to the chassis 4 of the vehicle 1. The angular position of the arms 3 is transmitted by means of a link 24 to an arrangement 21 which is shown in greater detail in FIGS. 2 and 3.

A pivot 25 which is parallel to axis A is fixed on the frame 4 and rotatably supports a semicircular indicator disk 22 which is connected to the link 24 and therefore assures an angular position relative to the frame 4 which corresponds to that of the support 3. Another semicircular element 23 is pivoted behind this element 22 on the shaft 25, with a spring 50 between them to hold the element 22 in position and urge the element 23 against the support so as to inhibit free rotation of this element 23. An upper adjustable stop 27 and a similar lower stop 28 are provided which limit the angle that the indicator 23 can pivot through. A handle 26 serves to set the position of indicator disk 23, Two switches 29 and 30 are carried on the element 23 and are engageable with the circularly arcuate periphery of the element 22 except when these two elements are aligned. A pointer 32 on the element 22 is alignable with a pointer 33 on the element 23, in which position the switches 29 and 30 are out of contact with the element 22, and a fixed centimeter scale 34 provided adjacent the pointer 33.

The lever 26 is actuated by the operator until the pointer 33 is adjacent a marking on scale 34 corresponding to how far the mower is to ride above the ground 6. The actual distance the mower is above the ground is shown by the pointer 32 on the scale 34. When the contacts 14S are closed the support 3 is moved to the set spacing since if the mower is below the desired height the element 22 will be twisted counterclockwise further than the element 23 and the switch 29 will be closed. This switch 29 is connected by contacts 14S between the battery and the input 16 so that the valve 9 will be actuated to raise the support 3 until the switch 29 is opened. Similarly if the support 2 is too high the switch 30 will be closed and the line 18 will be energized to lower the support 3.

In this manner the operator can displace the lever 43 to cause the support 3 to follow the terrain in front of the vehicle, or to ride at a set height relative to the vehicle 1. At any time he can push the lever and hold it in position to raise or lower the support 3, thereby overriding the normally programmed instructions, and as soon as he returns it to the set or follow position the support will automatically return to the programmed position. The switch 14 also has a central position in which none of the contacts are closed so that, for instance, when the machine 1 returns to the barn the operator can first lift the mower all the way up, then move the element 43 into a hold position in which the valve 9 stays in its central position and the cylinder is held at whatever pressure it had when the element 43 was moved into this position.

Figure 4:
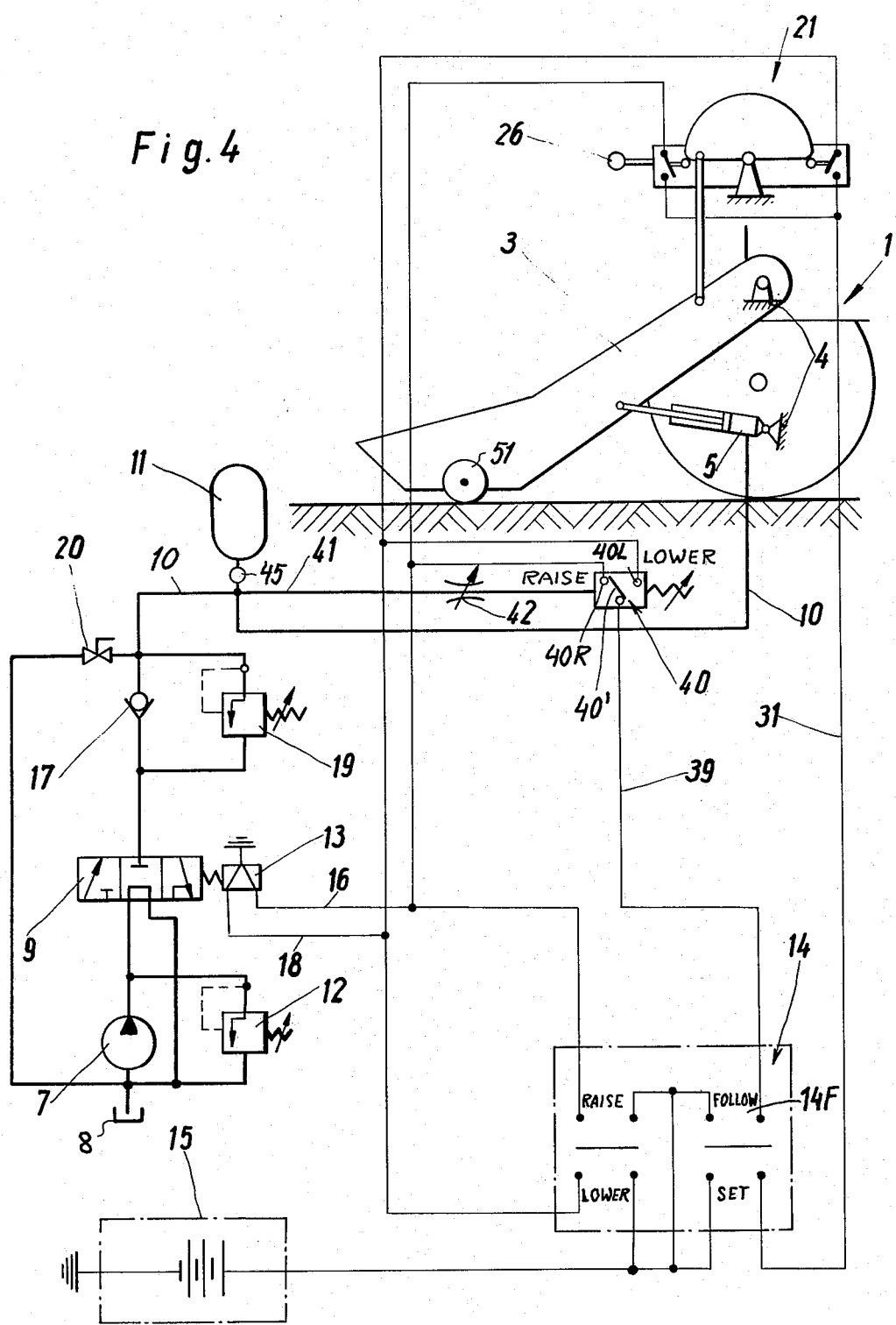
FIG. 4 is a schematic side view of a variant of the system of this invention.

The arrangement of FIG. 4 is similar to that of FIGS. 1–3 and may even be combined with that arrangement, with identical reference numerals applying to identical structure. In this arrangement however the support 3 is made to roll or slide on the ground, here wheels 51 being used. The line 10 to cylinder 5 is connected via a hydraulic line 41 through a pressure limiter 42 to a pressure-sensitive switch 40 which has an adjustable spring force that can be opposed to the hydraulic force in line 41 to move the switch element 40' from one contact 40L to another contact 40R respectively effective to lower and raise the element 3. The switch element 40' is connected via a wire 39 to one of contacts 14F, the other of contacts 14F being connected to battery 15.

The switch 40 is set so that when between 80 and 90 percent of the weight of the support 3 is being taken up by the cylinder 5, the corresponding pressure in line 10 is effective to hold element 40' in a central position out of engagement with either contact 40R or 40L. When, however, the ground under the support 3 drops off, all of the weight of the support 3 and its mower will be supported by the cylinder 5 and the pressure will rise in the line 10 to a pressure P max. This increase in pressure is transmitted, with a slight delay necessary to protect the switch 40, to this switch 40 to bring the element 40' against the contact 40L which is connected to the input 16 of the solenoid 13. The support 3 will then be lowered util the wheels 51 again take up about 15 percent of the weight of the support, whereupon the correspondingly lessened pressure in lines 10 and 41 will allow the pole element 40' to pull away from contact 40L. When, on the contrary, the pressure in the cylinder decreases by approximately 10 percent to a P $_{min}$ indicating that less than approximately 75 percent of the weight of the support 3 is being carried by the cylinder 5, and therefore that the ground under this support is rising, the pole 40' will drop back against contact 40R connected to the input 18. The support will drop until the pressure builds up above $P_{min}$, whereupon the pole 40' will pull away from contact 40L and the support will again be stabilized.

In this type of following operation the mower effectively floats on the ground ahead of the vehicle 1. This system insures a rapid response of the mower to the ground contours, and at the same time is sufficiently simple to have a relatively long service life.

Figure 5:
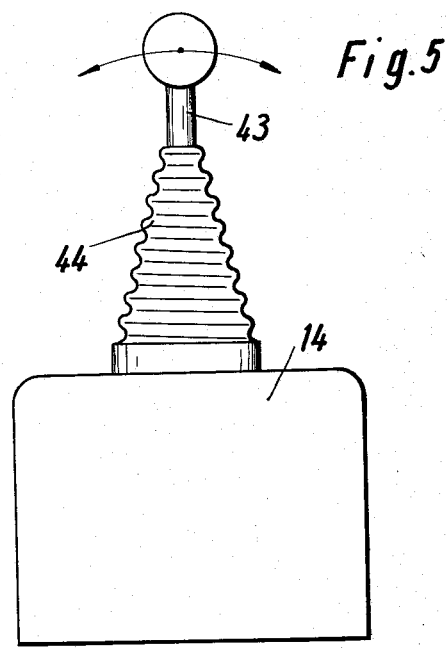
FIGS. 5 and 6 are side and top views of the operating lever for the system of this invention.
Figure 6:
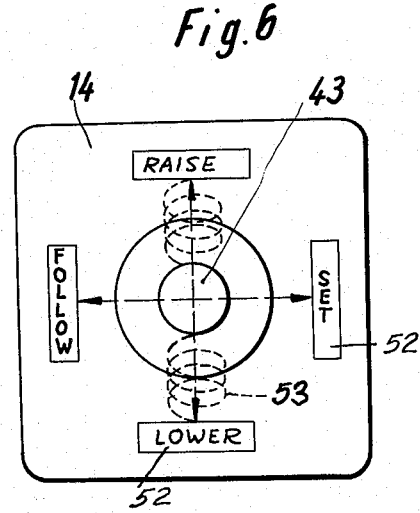
Figure 7:
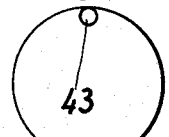
FIGS. 7–11 are top schematic views illustrating the various positions of the operator of FIGS. 5 and 6.
Figure 8:
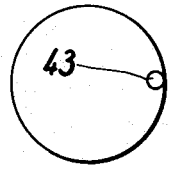
Figure 11:
Figure 9:
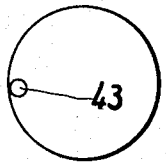
Figure 10:

FIGS. 5 and 6 show the switch 14 and its actuating element 43 which has a conventional cuff 44 that prevents foreign matter from falling within the switch mechanism. This switch 14 is mounted adjacent the operator's station so that he may grab and manipulate it readily. Four plaques 52 are provided which indicates the various positions --RAISE, LOWER, SET, and FOLLOW to which the lever may be moved. Compression springs 53 are braced diametrically against opposite sides of the lever 43 in line with the RAISE and LOWER positions thereof so that the lever must be held in these positions, and automatically serve to return it to the central HOLD position shown in FIG. 11. These springs 53 also serve to hold the lever 43 in the SET and FOLLOW positions shown in FIGS. 8 and 9 respectively by a toggle action. The RAISE position shown in FIG. 7 is away from or in front of the operator and the LOWER position of FIG. 10 is back, so that if the operator sees an obstacle he can quickly move the lever 43 into the logical position to raise the support 3. Since displacement of this lever also closes the valve 45 to cut off the accumulator 11, the support will lift very quickly. Subsequent return of the lever to any of the other positions except the HOLD position will lower the mower gently to the desired level.

Although the switch 14 is described as an electric switch which operates a solenoid-controlled valve, it is equally within the scope of the invention to control valve 9 hydraulically, pneumatically, or even mechanically. Similarly it is within the purview of this invention to support the mower on skids shaped as skis or as upwardly concave disks which slide on the ground. The invention is not limited to the particular embodiment illustrated and described.

We claim:
1. An agricultural machine comprising:
    a vehicle displaceable along the ground and having a frame;
    an implement support pivotally mounted on said frame;
    a hydraulic ram connected between said support and said frame;
    sources of relatively high hydraulic pressure and of relatively low hydraulic pressure connectable to said ram;
    valve means between said sources and said ram for pressurizing said ram thereby lifting said support and for depressurizing said ram thereby lowering said support;
    first sensor means connectable to said valve means for operating same to maintain said support in a predetermined position relative to said frame;
    second sensor means connectable to said valve means for operating same to maintain said support in a predetermined position relative to the ground;
    control means connected to said valve means and to said first and second sensor means and having a single control element displaceable between
        a set position connecting said first sensor means to said valve means,
        a follow position connecting said second sensor means to said valve means,
        a raise position operating said valve means to pressurize said ram, and
        a lower position operating said valve means to depressurize said ram; and
    means for retaining said control element releasably in two of said positions and enabling free displacement of said element into and out of the other positions, said valve means having three positions: a lift position in which said ram is connected to said source of high pressure, a drop position in which said ram is connected to said source of low pressure, and a stop position in which said ram is disconnected from both of said sources, said control element having a fifth hold position corresponding to said stop position of said valve means, said control element being a lever having an end displaceable between a central position corresponding to said hold position and a plurality of other positions surrounding said central position and corresponding to the other positions of said control element, said means for retaining said control element releasably and lockingly securing same in only said hold, set, and follow positions, said element being nonlockingly received in said raise and lower positions.

2. The machine defined in claim 1 wherein said second sensor means includes:
    a vertically displaceable feeler engageable with the ground; and
    a pair of limit switches operable by and vertically flanking said feelers, said switches being connectable through said control means to said valve means and being positioned such that vertical displacement of said feeler by the ground above a predetermined level actuates one of said switches and below a lower predetermined level actuates the other switch.

3. The machine defined in claim 1 wherein said second sensor means includes a pressure-sensitive switch connected to said ram and having a first switch part operable when hydraulic pressure in said ram drops below a first level and a second switch part operable when hydraulic pressure in said ram rises above another higher pressure level, said switch parts being connectable through said control means to said valve means.

4. The machine defined in claim 3 wherein said second sensor means includes a pressure line connected between said pressure-sensitive switch and said ram and a restriction in said line limiting flow therethrough.

5. The machine defined in claim 1, further comprising pressure lines interconnecting said valve means, said ram, and said sources, and an accumulator connected to the line between said valve means and said ram.

6. The machine defined in claim 5, further comprising a pressure-relief valve connected between the line from said source of high pressure to said valve means and said source of low pressure.

7. An agricultural machine comprising:

a vehicle displaceable along the ground and having a frame;

an implement support pivotally mounted on said frame;

a hydraulic ram connected between said support and said frame;

sources of relatively high hydraulic pressure and of relatively low hydraulic pressure connectable to said ram;

valve means between said sources and said ram for pressurizing said ram thereby lifting said support and for depressurizing said ram thereby lowering said support;

first sensor means connectable to said valve means for operating same to maintain said support in a predetermined position relative to said frame;

second sensor means connectable to said valve means for operating same to maintain said support in a predetermined position relative to the ground;

control means connected to said valve means and to said first and second sensor means and having a single control element displaceable between a set position connecting said first sensor means to said valve means, a follow position connecting said second sensor means to said valve means, a raise position operating said valve means to pressurize said ram, and a lower position operating said valve means to depressurize said ram; and means for retaining said control element releasably in two of said positions and enabling free displacement of said element into and out of the other positions, said valve means having three positions: a lift position in which said ram is connected to said source of high pressure, a drop position in which said ram is connected to said source of low pressure, and a stop position in which said ram is disconnected from both of said sources, said control element having a fifth hold position corresponding to said stop position of said valve means, said control element being a lever having an end displaceable between a central position corresponding to said hold position and a plurality of other positions surrounding said central position and corresponding to the other positions of said control element, said means for retaining said control element releasably and lockingly securing same in only said hold, set, and follow positions, said element being nonlockingly received in said raise and lower positions, said first sensor means including:

a pivot on said frame;

a set-value indicator carried on said pivot;

an actual-value indicator carried on said pivot adjacent and alignable with said set-value indicator;

a link between said actual-value indicator and said support for coupling same together, whereby the angular position of said actual-value indicator on said pivot corresponds to the position of said support relative to said vehicle;

means for positioning and holding said set-value indicator in a predetermined position;

a pair of switches mounted on one of said indicators and engageable with the other indicator, said switches being connectable through said control means to said valve means and being positioned such that at least one of said switches is actuated by said other indicator when said indicators are out of alignment.

8. The machine defined in claim 7 wherein said indicators are like semicircular disks and said switches are carried on the set-value indicator disk.

9. The machine defined in claim 7 wherein said first sensor means further comprises a height scale secured to said frame adjacent said set-point indicator, and pointers on said indicators alignable with said scale.

* * * * *